(12) United States Patent
Black, Jr. et al.

(10) Patent No.: US 7,311,183 B2
(45) Date of Patent: Dec. 25, 2007

(54) ADJUSTABLE CLUTCH BRAKE AND METHOD OF USE THEREOF

(76) Inventors: Robert A. Black, Jr., 1025 Lyndhurst Way, Conyers, GA (US) 30013; Jeffery Blane Schroer, 302 McKinley Ave., Warrenton, MO (US) 63383

( * ) Notice: Subject to any disclaimer, the term of this patent is extended or adjusted under 35 U.S.C. 154(b) by 163 days.

(21) Appl. No.: 11/091,180

(22) Filed: Mar. 28, 2005

(65) Prior Publication Data
US 2006/0213737 A1   Sep. 28, 2006

(51) Int. Cl.
*F16D 67/02* (2006.01)
*F16D 13/75* (2006.01)

(52) U.S. Cl. .............. 192/13 R; 192/110 R; 192/111.13; 192/111.6

(58) Field of Classification Search .......... 192/111 B
See application file for complete search history.

(56) References Cited

U.S. PATENT DOCUMENTS

| | | | |
|---|---|---|---|
| 555,512 A * | 3/1896 | Johnson | 403/362 |
| 1,005,727 A * | 10/1911 | Maurice | 411/209 |
| 2,070,813 A * | 2/1937 | Stearns et al. | 192/111 B |
| 4,043,437 A | 8/1977 | Taylor | |
| 4,059,176 A | 11/1977 | Lowery et al. | |
| 4,071,940 A | 2/1978 | Hazelton | |
| 4,141,439 A | 2/1979 | Lunde et al. | |
| 4,253,556 A | 3/1981 | Zindler | |
| 4,270,640 A * | 6/1981 | Davies | 192/107 R |
| 4,320,822 A | 3/1982 | Meldahl et al. | |
| 4,418,808 A | 12/1983 | Nagai | |
| 4,454,937 A | 6/1984 | Yang | |
| 4,489,817 A | 12/1984 | Gagnon et al. | |
| 4,511,023 A | 4/1985 | Nagai | |
| 4,524,853 A | 6/1985 | Nagai | |
| 4,534,454 A | 8/1985 | Brooks | |
| 4,703,841 A | 11/1987 | Lengsfeld et al. | |
| 4,712,659 A | 12/1987 | Flotow | |
| 4,782,926 A | 11/1988 | Kitano et al. | |
| 4,947,969 A | 8/1990 | Tarlton, Sr. | |
| 5,076,406 A * | 12/1991 | Gregory et al. | 192/13 R |
| 5,285,881 A | 2/1994 | Lero et al. | |

(Continued)

OTHER PUBLICATIONS

4 photographs of Bohn Brake (4 pages).

*Primary Examiner*—Rodney H. Bonck
(74) *Attorney, Agent, or Firm*—Myers & Kaplan, LLC; George P. Bonanto; Joel D. Myers (57) ABSTRACT

A clutch brake device comprising two concentric ring-shaped plate sections, threadably and adjustably secured together via four screws. The screws pass through the periphery of the exterior plate and extend into depressions on the interior plate. The interior plate has central tangs that engage keyway slots in an input shaft. The outer plate has tabs symmetrically positioned around its outer periphery, wherein the tabs can receive force from a rod, or the like, to move the outer plate relative to the inner plate to facilitate threaded relative adjustment. Each ring-shaped plate has thereon a frictional surface, wherein each frictional surface is dimensionally different from the other. An alternate embodiment comprises a camming member, having two slidably separable plates. The first plate rides up the ramp sections of a second plate, thereby causing the first plate to separate axially from the second plate and, thus, expand the clutch brake.

24 Claims, 4 Drawing Sheets

U.S. PATENT DOCUMENTS

| | | |
|---|---|---|
| 5,325,949 A | 7/1994 | Dommett et al. |
| 5,415,256 A | 5/1995 | Weigand et al. |
| 5,435,425 A | 7/1995 | Ijames |
| 5,452,780 A | 9/1995 | Gabilondo |
| 5,456,344 A | 10/1995 | Nellums |
| 5,873,444 A | 2/1999 | Kozhevnikov et al. |
| 6,450,310 B1 | 9/2002 | Catrinta |
| 6,827,193 B2 * | 12/2004 | Conrad et al. ........... 192/111 B |
| 2002/0117362 A1 | 8/2002 | Catrinta |
| 2002/0148695 A1 | 10/2002 | Latsko |
| 2002/0157913 A1 | 10/2002 | Shimizu et al. |
| 2003/0062234 A1 | 4/2003 | Aker |
| 2004/0035665 A1 | 2/2004 | Mochizuki |

* cited by examiner

ADJUSTABLE CLUTCH BRAKE AND METHOD OF USE THEREOF

TECHNICAL FIELD

The present invention relates generally to clutch brakes, and more specifically to an adjustable clutch brake for trucks, wherein the clutch brake can be adjusted while positioned on the vehicular drive train without requiring sophisticated tooling; thereby, enabling adjustment while a vehicle is parked on a roadside or the like, and away from an otherwise conveniently accessible vehicular maintenance facility.

BACKGROUND OF THE INVENTION

Clutch brakes are devices that slow and stop the rotation of a transmission input shaft to facilitate shifting of gears, particularly in large vehicles, such as over-the-road trucks.

Transmissions on class 8 over-the-road trucks are not fully synchronized, which requires the input shaft from the transmission to be completely stopped before shifting into first or reverse gears. One method is to stop the truck, shut off the engine, shift into the desired gear and restart the engine. Because of the inconvenience of stopping the truck to perform these steps, clutch brakes have been added to stop the input shaft, thereby permitting shifting of gears while the truck is in motion.

Most such clutches are pull-type clutches, wherein the throw-out bearing is pulled towards the transmission to shift gears. To shift into first or reverse gears, the throw-out bearing is pulled back to make contact with the clutch brake and the front of the transmission, which causes a squeezing effect that stops the transmission input shaft from turning. The gears are then shifted and the clutch throw-out bearing is released completing the shift action.

Pull-type clutches are adjustable by turning an internal ring that compensates for wear of the clutch disc and flywheel surfaces. When an internal adjustment is made, the clutch is returned to original specifications, as the clutch requires specific clearance to prevent premature failure of the clutch. When the flywheel is new and a new clutch assembly is installed, there is approximately ½ inch clearance between the clutch brake and the throw-out bearing. When installing new clutch assemblies, flywheels should be resurfaced to eliminated the wear effects of the previous clutch on the flywheel, or alternately, the flywheel should be replaced. The bearing cap retainer, located on the front of the transmission where the clutch brake contact also wears and should be replaced with a new bearing cap. However, the bearing cap retainer should preferably not be resurfaced. Every time the flywheel is resurfaced by grinding, the clutch assembly moves closer to the engine and farther from the clutch brake and transmission. Most flywheels are resurfaced numerous times, so the ½ inch dimensional clearance increases. Wear of the bearing cap on the transmission also causes an increase in this gap.

During installation, clutch brakes are commonly installed over the input shaft between the transmission and the clutch. The input shaft has a keyway, wherein internal tangs extending from the clutch brake engage the keyway to permit the clutch brake to stop the rotation of the input shaft.

Specifically, the clutch brake rides on the transmission input shaft and is disposed between the clutch assembly and the transmission. The input shaft typically has two keyways disposed therein, wherein the keyways cooperatively engage with tangs on the clutch brake. The clutch brake further comprises an approximately ⅜ inch thick plate assembly having frictional surfaces on both ends thereof.

An example of such internal tangs are screw fasteners. However, as is commonly experienced, screw fasteners can loosen with time and become unfastened, thereby diminishing the functionality of same, and potentially causing damage to critical drive train components.

In addition to internal tangs, external tabs are typically found on clutch brakes, wherein such external tabs provide connection points for attachment of the clutch brake to a frame. Unfortunately, however, such attachment point tabs are fixed and immovable once attached to a frame mount, thereby preventing any adjustment of the clutch brake.

Other devices provide two separate plates secured via threads, wherein the plates are restrained from rotation by a bolt extending into one of the plates, and wherein the bolt secures a jockstrap that sits in a detent in the other plate, thereby preventing rotation of same. However, the aforementioned jockstrap and fastener therefor can loosen due to general vehicular vibration, thus causing unexpected adjustment of the clutch brake, and/or causing damage to critical drive train components.

Still other devices provide an adjustable clutch made from two half-circular sections, wherein the two sections are fastened together via bolts extending through the sections. In such devices, the bolts serve as tangs to engage the keyway of an input shaft and, as such, can loosen with general vehicular vibration and time; thereby, resulting in disengagement of the bolts from the input shaft, and/or damage to critical drive train components. The device further lacks an adjustment mechanism, thereby requiring replacement of same when such adjustments are needed.

Some devices provide arms bolted to a portion of the outer of two plate sections, wherein the arms extend and latch beneath bars disposed on the inner of two plate sections. However, such devices are not clutch brakes, but rather clutches themselves, and further are not adjustable. Accordingly, such devices unable to slow rotation of a clutch and must be replaced when adjustment is necessary.

Additional devices include the use of frictional pads or similar materials on the surface of the clutch brake; however, such frictional pads do not facilitate adjustment of a clutch brake pack and, therefore, are unsuitable for varying dimensional requirements or field replaceability.

Therefore, it is readily apparent that there is a need for a clutch brake that can be adjusted while installed on a vehicle without the need for special tools, and which does not loosen during use; thus, avoiding the above-described disadvantages.

BRIEF SUMMARY OF THE INVENTION

Briefly described, in a preferred embodiment, the present invention overcomes the above-mentioned disadvantages and meets the recognized need for such a device by providing an apparatus and method for a clutch brake that can be adjusted while installed on a vehicle, without requiring use of special tools. The adjustable clutch brake comprises two threadedly-attached half sections that permit expansion and contraction of the overall device by rotation of the two half sections relative to one another. The two half sections are removably secured to one another by screws that pass through one half section and enter a detent on the other half section. The adjustable clutch brake further comprises tangs to engage an input shaft keyway and tabs that facilitate rotation of the half sections relative to one another. Frictional pads on the outer surfaces of the adjustable clutch brake provide replaceable wear surfaces and further can selectively be of differing thicknesses to accommodate dimensional variations in installation.

Notably, the adjustable clutch brake permits adjustment after installation and use, wherein simple tools can be utilized to perform any necessary adjustments.

According to its major aspects and broadly stated, the present invention in its preferred form is an adjustable clutch brake comprising a threaded expandable plate set secured in a selected position via screws inserted from the outer periphery, wherein the screws bottom in a detent to release or lock the plate set together.

Adjustment of the clutch brake is accomplished by rotating the plates comprising the plate set to expand or contract the clutch brake.

The brake can be easily adjusted while on a vehicle by loosening the screws to allow rotation of the plates relative to each other and then re-tightening the screws to secure the plates, thus preventing further relative rotation. If a greater effort is required for plate rotation, a set of tabs on each plate provides a leverage point, or a suitable point for providing impact to impart rotation.

More specifically, the present invention is an adjustable clutch brake and method of use thereof, wherein the adjustable clutch brake comprises two plates threadedly assembled and secured by fasteners. The fasteners pass through the first plate and are tightened within, and against, a depression or detent in the second plate, thereby preventing loosening of the fasteners. Tangs on the inner surface of the combined plates engage a keyway, or keyways, on the input shaft from a vehicle's engine, thereby providing rotation of the clutch brake.

The adjustable clutch brake can be installed when the input shaft is installed, or, alternately, a hingable version can be serviced and/or replaced during maintenance by opening and re-securing the plates over the input shaft.

Once installed, the adjustable clutch brake can be expanded or contracted by relieving fasteners, selectively rotating the two plates relative to one another, and subsequently re-securing the plates with the fasteners. Adjustment is preferably carried out in increments depending on the number of screws and detents. Tabs on the external periphery of the plates provide a leverage point or location to strike or drive with a hammer to overcome frictional forces preventing rotation of the plates once the screws are removed. Thus, the clutch brake can be easily adjusted by a mechanic utilizing simple tools.

Additionally, frictional pads of selected thickness dimensions can be applied at each end of the clutch brake to compensate for clearance between the clutch brake and the transmission, or between the clutch brake and the throw-out bearing.

The adjustable clutch brake of the present invention compensates for flywheel wear so that an internal clutch adjustments is not required to achieve the ½ inch clearance between the clutch brake and the clutch. The adjustable clutch brake permits the clutch to function properly without having to replace the expensive flywheel and/or bearing cap retainer. No special tools are required, and adjustment does not require excessive time. The adjustable brake permits the installer to bring the clutch brake to the clutch, not the clutch to the brake on the initial clutch installation, thereby achieving the ½ inch clearance between the clutch and the clutch brake. All maintenance adjustment to the clutch after the installation of the new clutch assembly should be made by adjusting the clutch internally. When the clutch cannot be internally adjusted because of debris buildup in the cover assembly thereof, the adjustable clutch brake can be adjusted to achieve the ½ inch clearance between the throw-out bearing and the clutch brake. This permits the clutch to be utilized for longer periods without the need for replacement.

The adjustable clutch brake of the present invention provides not only the stopping of the input shaft, but also permits utilization of inexpensive components to extend the life of the more expensive clutch, while not affecting operation. Furthermore, the adjustable clutch brake of the present invention is rebuildable in the truck without requiring removal of the input shaft.

In presently available clutch brakes, the weakest part is the tangs that engage the keyways in the input shaft. When the tangs shear off, the entire clutch brake must be replaced. In the adjustable clutch brake of the present invention, the four locking screws that facilitate adjustment may simply be removed and replaced without removing the clutch brake from the input shaft, thereby restoring the clutch to new status without the need for special tools or expensive parts.

An additional benefit of the present invention is the ability to further adjust clearances while at the same time adding frictional material surface. A split donut of adhesively backed frictional material can be inserted over the input shaft and adhered to the clutch brake surface. By adding frictional material, the clutch brake pack can compensate for flywheel and bearing cap wear, so that internal clutch adjustment can be avoided during initial clutch installation in order to achieve the ½ inch bearing to clutch brake clearance.

Accordingly, a feature and advantage of the present invention is its ability to be adjusted away from an otherwise conveniently accessible maintenance facility.

Another feature and advantage of the present invention is its ability to be readily replaced without requiring removal of the input shaft.

Still another feature and advantage of the present invention is its ability to fit installations of varying dimensions.

Yet another feature and advantage of the present invention is that adjustment of same requires only simple tools.

Yet still another feature and advantage of the present invention is that it provides security against loosening of component parts.

A further feature and advantage of the present invention is that it can be adjusted by a vehicle driver without assistance.

Still a further feature and advantage of the present invention is that frictional pads can be applied to the clutch brake to compensate for wear of the flywheel and/or clutch, thereby restoring the desired dimensional clearances between clutch and transmission components.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1-6, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
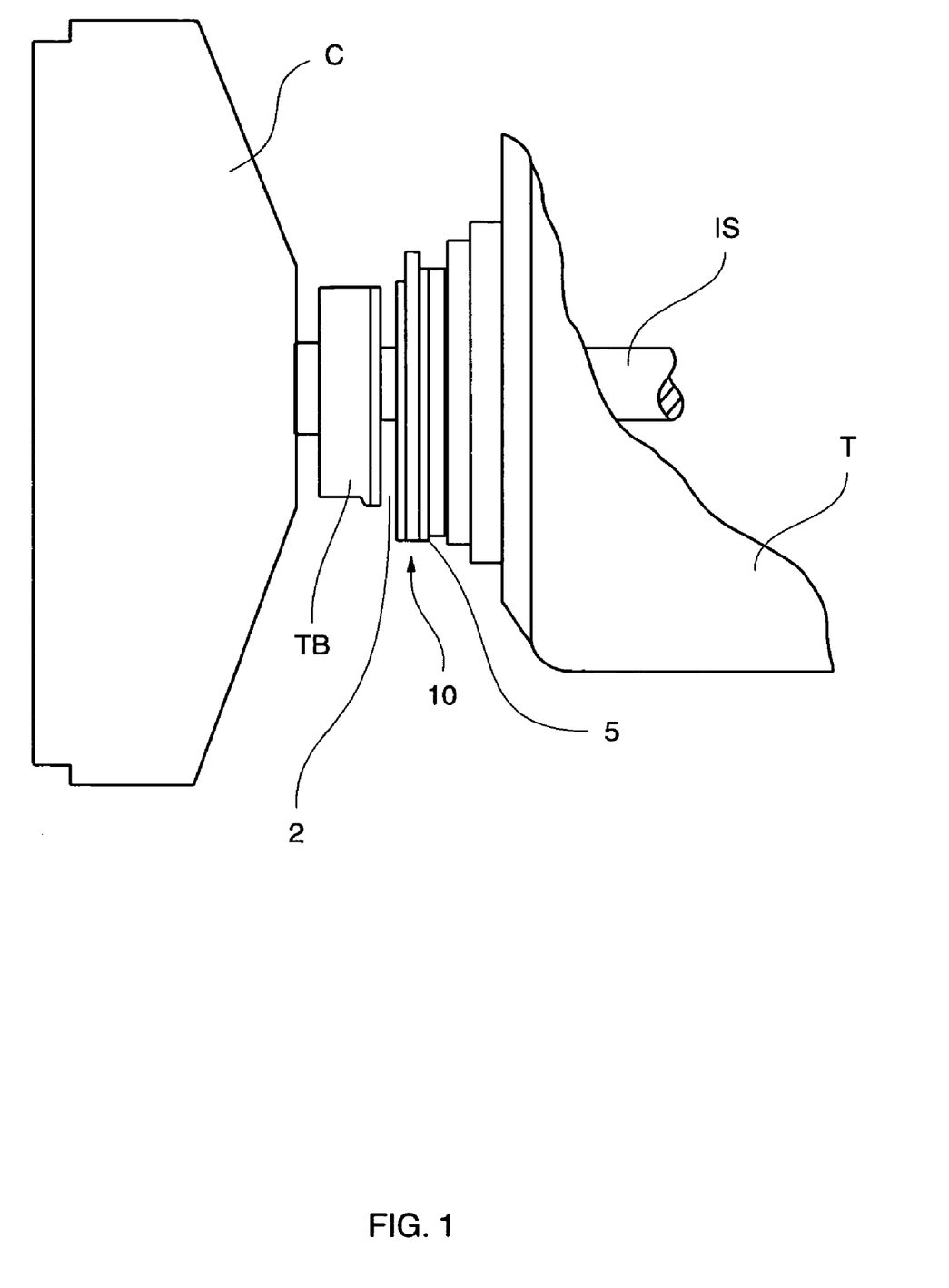
FIG. 1 is a side view of an adjustable clutch brake according to a preferred embodiment of the present invention, shown in place on an input shaft between a transmission and a clutch.

Referring now to FIG. 1, adjustable clutch brake 10 is disposed on input shaft IS between clutch C and transmission T, wherein adjustable clutch brake 10 has frictional pad 5 disposed thereon, and wherein adjustable clutch brake 10 is distanced from throw-out bearing TB by gap 2.

Figure 2:
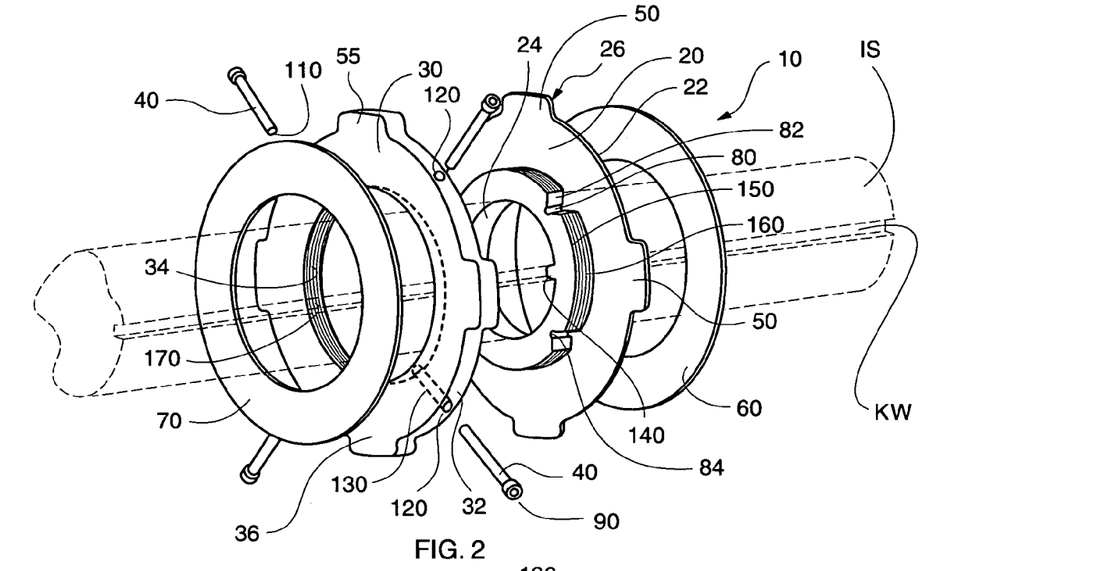
FIG. 2 is an exploded perspective view of an adjustable clutch brake according to a preferred embodiment of the present invention.

Referring now more specifically to FIG. 2, the present invention in a preferred embodiment is an adjustable clutch brake 10, wherein adjustable clutch brake 10 preferably comprises first plate 20, second plate 30, fasteners 40, first friction pad 60 and second friction pad 70. First plate 20 preferably comprises external periphery 22, internal periphery 24, platform 150, tabs 50 and tangs 140, wherein tabs 50 are preferably disposed on, and evenly spaced around, external periphery 22 of first plate 20. Tangs 140 are preferably disposed on internal periphery 24 of first plate 20, wherein tangs 140 are preferably selectively positioned to adaptively receive keyway KW of input shaft IS. It will be noted by those skilled in the art that input shaft IS may have single, dual or a plurality of keyways KW; therefore, first plate 20 will have a corresponding number of tangs 140. Platform 150 preferably comprises threads 160, wherein threads 160 are preferably adapted to threadably-receive threads 170 of second plate 30.

Second plate 30 preferably comprises external periphery 32, internal periphery 34, aperture 120, threaded shaft 130 and tabs 55, wherein tabs 55 are preferably disposed on, and evenly spaced around, external periphery 32 of second plate 30. Threads 170 are preferably disposed on internal periphery 34, wherein threads 170 are preferably adapted to threadably-receive threads 160 of first plate 20.

Platform 150 of second plate 20 preferably comprises a plurality of detents 80, wherein detents 80 comprise sides 82 and bottoms 84, and wherein bottoms 84 are preferably dimensionally-adapted to receive tips 110 of fasteners 40. Sides 82 preferably serve to facilitate guidance of fasteners 40 into bottoms 84. It will be recognized by those skilled in the art that any number of fasteners 40 and corresponding detents 80 could be utilized to select the increments and locking positions of rotation of plates 20, 30 relative to one another.

Threaded shaft 130 preferably passes through second plate 30 from external periphery 32 to internal periphery 34. Insertion of fastener 40 through threaded shaft 130 via aperture 120 preferably secures fastener 40 within threaded shaft 130 and preferably permits tip 110 of fastener 40 to reach bottom 84, wherein tip 110 of fastener preferably bindingly contacts bottom 84 and adheres thereto, thereby preferably preventing unexpected rotation of fastener 40.

First frictional pad 60 and second frictional pad 70 are preferably bonded to first surface 26 and second surface 36, respectively, via glue, or the like. Additionally, first frictional pad 60 and second frictional pad 70 can be of differing thicknesses in order to dimensionally accommodate variations within the installed location. Additionally, a separate frictional pad 5 (best shown in FIG. 6) can be installed over frictional pads 60, 70 to further increase thickness of adjustable clutch brake 10.

In operation, adjustable clutch brake 10 is preferably assembled by threading first plate 20 and second plate 30 together, and adjusted by selectively rotating first plate 20 relative to second plate 30, wherein adjustment is preferably carried out in increments proportional to the number of fasteners 40 and corresponding detents 80. Once adjusted, adjustable clutch brake 10 is preferably secured via fasteners 40, wherein first plate 20 and second plate 30 are preferably rotationally-fixed relative to each other by extension of fasteners 40 into detents 80. Subsequently, adjustable clutch brake 10 is typically installed over input shaft IS during installation of input shaft IS during clutch replacement, wherein tangs 140 engage keyways KW of input shaft IS. However, alternate embodiment adjustable clutch brake 100 (best shown in FIG. 3) can be installed over an existing installed input shaft IS, as set forth more fully hereinbelow.

Once installed, adjustable clutch brake 10 can be expanded or contracted by relieving fasteners 40, preferably selectively rotating first plate 20 and second plate 30 relative to one another, and preferably re-securing plates 20, 30 via fasteners 40. If rotation of first plate 20 relative to second plate 30 is difficult due to corrosion or dirt, tapping on tabs 50 and/or tabs 55 with a hammer, pry bar, or similar device, preferably facilitates freeing first plate 20 and second plate 30 to enable rotation relative to one another. Alternately, tabs 50 or tabs 55 can be fixed in place by jamming same with an object, such as a screwdriver, against a suitable surface, and apply hammer force to the other set of tabs 55 or 50, respectively, to facilitate rotation of first plate 20 and second plate 30 relative to one another.

Figure 3:
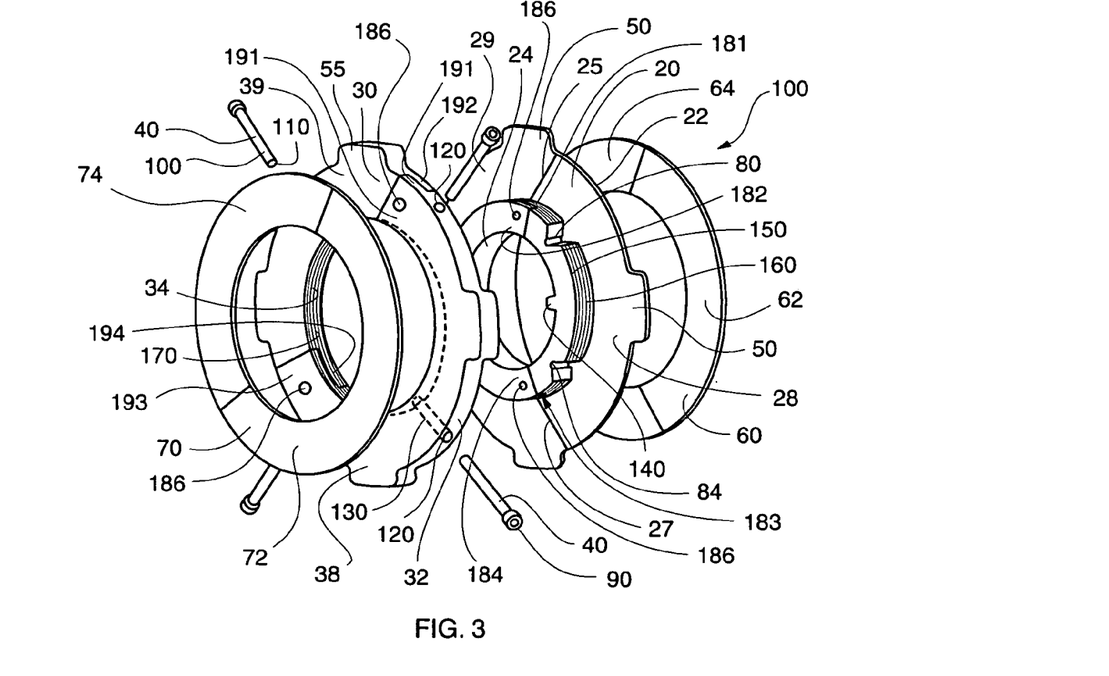
FIG. 3 is an exploded perspective view of an adjustable clutch brake according to an alternate embodiment of the present invention.

Referring now more specifically to FIG. 3, illustrated therein is an alternate embodiment of adjustable clutch brake 10, wherein the alternate embodiment of FIG. 3 is substantially equivalent in form and function to that of the preferred embodiment detailed and illustrated in FIG. 2 except as hereinafter specifically referenced. Specifically, the embodiment of FIG. 3 comprises adjustable clutch brake 100, wherein adjustable clutch brake 100 comprises first plate 20, second plate 30 and lock screws 186. First plate 20 comprises first half 28 and second half 29, and second plate 30 comprises first half 38 and second half 39, wherein first half 28 and second half 29 are removably secured together via lock screws 186, and wherein first half 38 and second half 39 are removably secured together via lock screws 186. First half 28 and second half 29 are separable via breaks 25 and 27.

First half 28 comprises overlap interlocks 181, 183 and second half 29 comprises overlap interlocks 182, 184, wherein overlap interlocks 181, 182 interlock with one another and are removably secured via lock screws 186, and wherein overlap interlocks 183, 184 interlock with one another and are removably secured via lock screws 186. First half 38 further comprises overlap interlocks 191, 193 and second half 39 comprises overlap interlocks 192, 194, wherein overlap interlocks 191, 192 interlock with one another and are removably secured via lock screws 186, and wherein overlap interlocks 193, 194 interlock with one another and are removably secured via lock screws 186.

Adjustable clutch brake 100 further comprises first friction pad first half 62, first friction pad second half 64, second friction pad first half 72, and second friction pad second half 74, wherein first and second halves 62, 64 are adhesively secured to first plate first half 28 and first plate second half 29, respectively, and wherein first and second halves 72, 74 are adhesively secured to second plate first half 38 and second plate second half 39, respectively.

Adjustable clutch brake 100 is installed over input shaft IS (best shown in FIG. 2) by removing lock screws 186, thereby permitting opening of first half 28 relative to second half 29, and first half 38 relative to second half 39. Closing first half 28 to join second half 29, and closing first half 38 to join second half 39, reassembles adjustable clutch brake 100, wherein adjustable clutch brake 100 is re-secured via lock screws 186. Adjustable clutch brake 100 is subsequently adjusted and secured in the same fashion as described hereinabove for adjustable clutch brake 10.

Figure 4A:
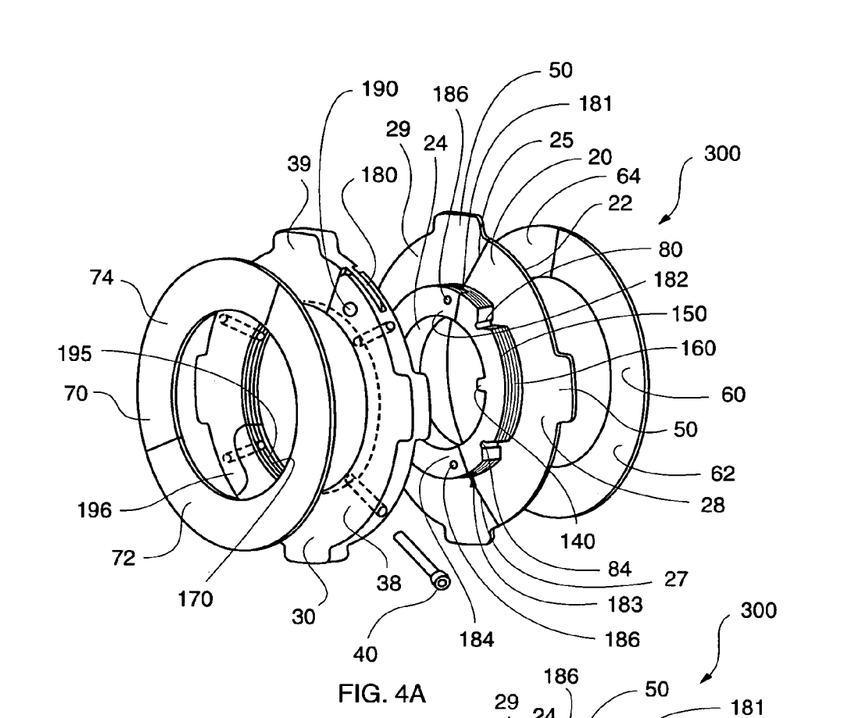
FIG. 4A is an exploded perspective view of an adjustable clutch brake according to an alternate embodiment of the present invention, shown in a closed position.
Figure 4B:
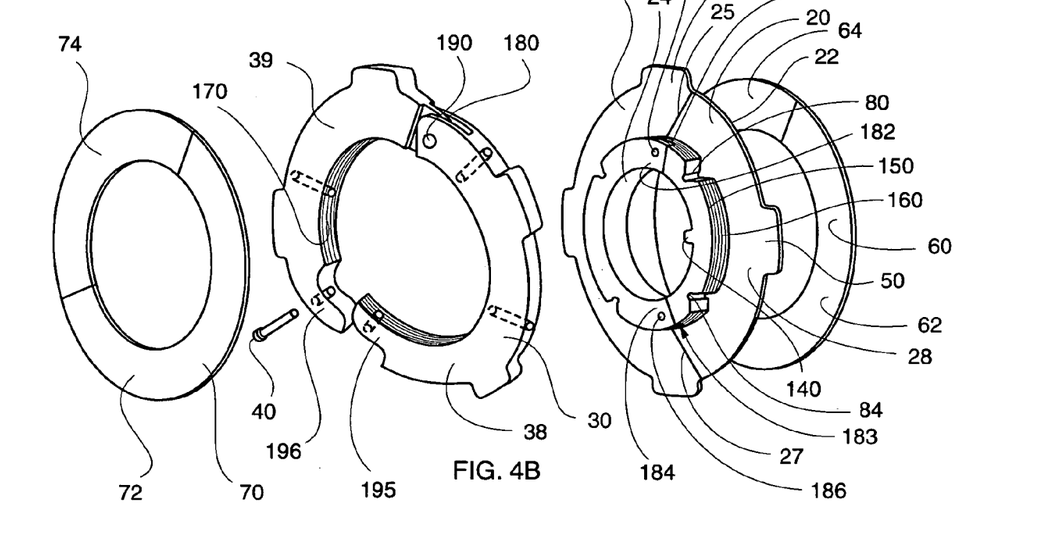
FIG. 4B is an exploded perspective view of an adjustable clutch brake according to an alternate embodiment of the present invention, shown in an open position.

Referring now more specifically to FIGS. 4A and 4B, illustrated therein is another alternate embodiment of adjustable clutch brake 10, wherein the alternate embodiment of FIGS. 4A and 4B is substantially equivalent in form and function to that of the preferred embodiment detailed and illustrated in FIG. 2 except as hereinafter specifically referenced. Specifically, the embodiment of FIGS. 4A and 4B comprises adjustable clutch brake 300, wherein adjustable clutch brake 300 comprises first plate 20 and second plate 30. Second plate 30 comprises first half 38 and second half 39, pivot pin 190 and hinge 180, wherein first half 38 and second half 39 are hingedly attached via hinge 180.

First plate 20 may be installed over existing input shaft IS during vehicular installation of input shaft IS, or alternately, may be changed without removing transmission T via separation of first half 28 and second half 29, as more fully described in FIG. 3 hereinabove. First half 38 and second half 39 of second plate 30 can be removed from input shaft IS by removal of fastener 40, followed by pivotal separation of first half 38 from second half 39 about pivot pin 190 of hinge 180. Thereby, second plate 30 can be removed from input shaft IS for servicing of adjustable clutch brake 300. Subsequent to removal of second plate 30, first plate 20 can be moved along input shaft IS to provide access to frictional pad 60, wherein frictional pad 60 is adhesively secured to first plate 20, and wherein frictional pad 60 comprises friction pad first half 62 and friction pad second half 64. While second plate 30 is removed, adhesive frictional pad 5 can be installed on first plate 20 and adhesive frictional pad 5 can be installed on second plate 30. Following replacement of frictional pad halves 62, 64, 72, 74, adjustable clutch brake 300 is reassembled. Adjustable clutch brake 300 is subsequently adjusted and secured in the same fashion as described hereinabove for adjustable clutch brake 10.

Figure 5:
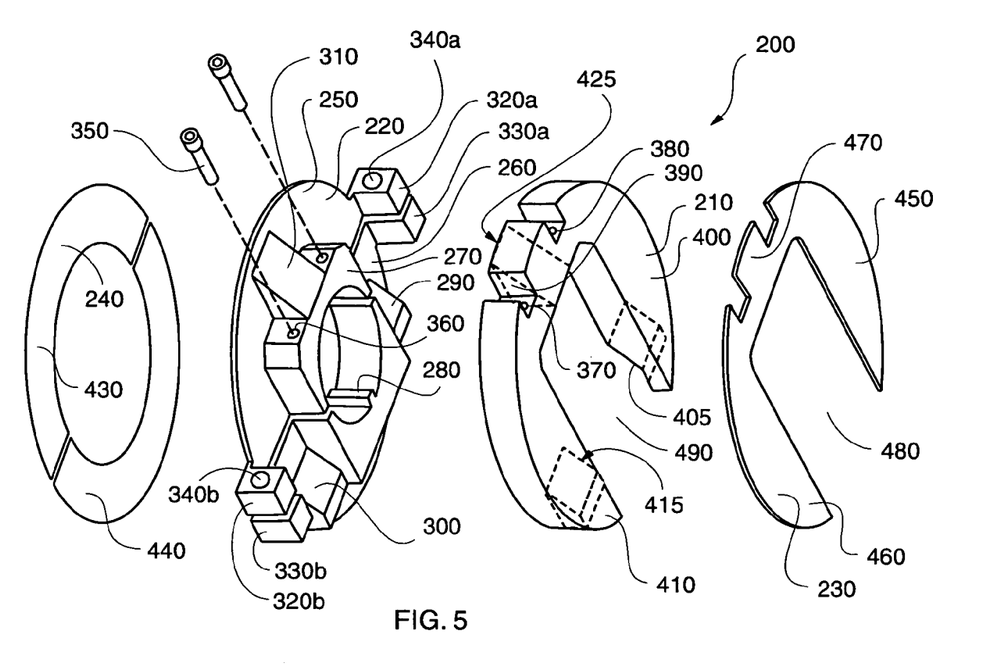
FIG. 5 is an exploded perspective view of an adjustable clutch brake according to an alternate embodiment of the present invention; and, FIG. 6 is a plan view of a frictional pad component of an adjustable clutch brake according to an alternate embodiment of the present invention.

Referring now more specifically to FIG. 5, illustrated therein is an alternate embodiment of adjustable clutch brake 10, wherein the alternate embodiment of FIG. 5 is substantially equivalent in form and function to that of the preferred embodiment detailed and illustrated in FIG. 2 except as hereinafter specifically referenced. Specifically, the embodiment of FIG. 5 comprises camming adjustable clutch brake 200, wherein camming adjustable clutch brake 200 comprises first plate 210, second plate 220, fasteners 340*a*, 340*b* and screws 350.

First plate 210 comprises first leg 400, second leg 410, back 390, and oval apertures 370, 380, wherein first leg 400 and second leg 410 form opening 490 therebetween. First relief 405 is disposed on first leg 400, second relief 415 is disposed on second leg 410 and third relief is disposed on back 390.

Second plate 220 comprises first section 250, second section 260, platform 270, tangs 280, and ramps 290, 300, 310. First section 250 comprises first support 320*a*, second support 320*b* and threaded apertures 360. Second section 260 comprises threaded support 330*a* and threaded support 320*b*.

Reliefs 405, 415, 425 are adapted to cooperatively engage ramps 290, 300, 310, respectively, to permit first plate 210 and second plate 220 to slidably engage. Ramp reliefs 405, 415, 425 of first plate 210 slide up or down ramp sections 290, 300, 310, thereby moving first plate 210 axially relative to second plate 220 and respectively expanding or contracting camming adjustable clutch brake 200.

Frictional pad 230 comprises first member 450, second member 460 and back 470, wherein first member 450 and second member 460 form opening 480 therebetween, and wherein opening 480 is adapted to align with opening 490 in first plate 210. Frictional pad 240 comprises first half 430 and second half 440, wherein frictional pad 240 is disposed on second plate 220, and wherein first half 430 is disposed on first section 250 of second plate 220 and second half 440 is disposed on second section 260 of second plate 220.

Adjustable clutch brake 200 is assembled by placing first section 250 and second section 260 of second plate 220 around input shaft IS (best shown in FIG. 1), securing first section 250 and second section 260 together via fasteners 340*a* and 340*b*, wherein fastener 340*a* passes through first support 320*a* and threadably engages threaded support 330*a*, and wherein fastener 340*b* passes through second support 320*b*, and threadably engages threaded support 330*b*. Subsequently, first half 430 and second half 440 of frictional pad 240 are attached to first section 250 and second section 260, respectively, of second plate 220, wherein halves 430, 440 of frictional pad 240 are secured to sections 250, 260, respectively, via adhesive, such as, for exemplary purposes only, glues, resins, epoxies, and the like.

Next, first plate 210 is placed over input shaft IS, aligned with second plate 220, and secured via screws 350, wherein screws 350 pass through oval apertures 370, 380 and threadably engage threaded apertures 360 of first section 250. Frictional pads 230, 240 are bonded to first plate 210 and second plate 220, respectively, during manufacture of adjustable clutch brake 200.

To adjust clutch brake 200, screws 350 are loosened and first plate 210 is moved up or down ramps of second plate 220, thereby selectively expanding or contracting clutch brake 200. Oval apertures 370, 380 permit screws 350 to remain attached to second plate 220, while permitting limited axial movement of first plate 210 and second plate 220. After the selected position of first plate 210 and second plate 220 has been achieved, screws 350 are re-tightened to secure first plate 210 and second plate 220 together for operational use.

Figure 6:
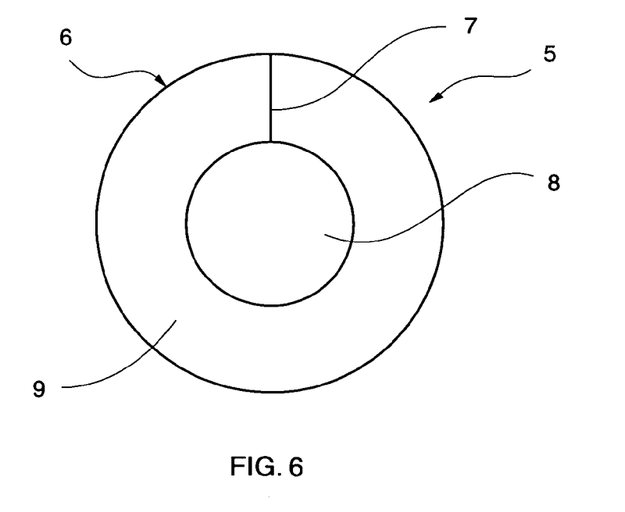

Referring now more specifically to FIG. 6, depicted therein is frictional pad 5, wherein frictional pad 5 comprises pad surface 9, aperture 8, adhesive surface 6 and split 7. Frictional pad 5 can be selectively applied, when required, to first plate 20 or second plate 30 of clutch brake 10, wherein aperture 8 encompasses input shaft IS, and wherein adhesive surface 6 is disposed proximate first plate 20 or second plate 30. Frictional pad 5 is typically applied to first plate 20 and can be selectively dimensioned to provide a suitable clearance between adjustable clutch brake 10 and transmission T.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An adjustable clutch brake comprising:
   a first member comprising a first generally disc-shaped body having a central bore disposed therethrough, external threads disposed about at least a portion of said first generally disc-shaped body, and at least one detent extending radially inward from said external threads;
   a second member comprising a second generally disc-shaped body having a central bore disposed therethrough, internal threads disposed about said central bore, and at least one bore extending radially outward through said second generally disc-shaped body from said central bore; and
   at least one fastener,
   wherein said internal threads of said second member are threadably engageable with said external threads of said first member, and wherein rotation of said second member with respect to said first member adjusts an axial dimension of said clutch brake, and wherein a first friction pad having a first thickness is removably disposed on an external surface of said first member and a second friction pad having a second thickness is removably disposed on an external surface of said second member.

2. The adjustable clutch brake of claim 1, wherein at least one of said first member and said second member further comprises a first arcuate section and a second arcuate section removably connected to each other to form said generally disc-shaped body.

3. The adjustable clutch brake of claim 2 wherein said first arcuate section is hingedly connected to said second arcuate section.

4. The adjustable clutch brake of claim 1, wherein said at least one fastener extends radially through at least a portion of said radial bore of said second member and into said at least one detent, bindingly engaging said at least one detent and preventing rotation of said first member relative to said second member.

5. The adjustable clutch brake of claim 1, further comprising at least one internal tang disposed on said first member projecting radially into said central bore of said second member, said at least one internal tang cooperatively engageable with a keyway in an input shaft disposed through said central bore to prevent rotation of said first member with respect to the input shaft.

6. The adjustable clutch brake of claim 1, further comprising at least one external tab disposed on each of said first member and said second member, wherein said at least one external tab of said first member is disposed at a first angular displacement from said at least one detent and wherein said at least one external tab of said second member is disposed at a second angular displacement from said at least one radial bore, said first angular displacement being equal to said second angular displacement such that when said at least one external tab of said first member is aligned with said external tab of said second member, said at least one radial bore is aligned with said at least one detent.

7. The adjustable clutch brake of claim 6, wherein said external tab of said second member comprises a striking surface adapted to receive an impact force, said impact force causing rotation of said second member relative to said first member.

8. The adjustable clutch brake of claim 6, wherein said at least one external tab comprises a plurality of evenly spaced external tabs, said at least one detent comprises a plurality of evenly spaced detents, and said at least one radial bore comprises a plurality of evenly spaced radial bores, and wherein alignment of any tab of said first member with any tab of said second member aligns each of said plurality of detents with a respective one of said plurality of radial bores, whereby alignment of any tab of said first member with any tab of said second member allows said at least one fastener to be inserted into any of said plurality of detents through a respective radial bore aligned therewith.

9. The adjustable clutch brake of claim 1, further comprising at least one generally disc-shaped frictional pad, having a central bore disposed therethrough, disposed on at least one of a first surface of said first member opposite said second member, and a second surface of said second member opposite said first member.

10. The adjustable clutch brake of claim 9, wherein said at least one generally disc-shaped friction pad comprises at least one radial slit therethrough.

11. The adjustable clutch brake of claim 1 wherein said first thickness is different than said second thickness.

12. The adjustable clutch brake of claim 1 wherein at least one of said first thickness and said second thickness is selected to create a gap having a predetermined distance between a respective friction pad and a friction surface of a drivetrain component of a vehicle.

13. A method of adjusting a clutch brake comprising the steps of:
   obtaining a clutch brake comprising a first member and a second member, wherein said first member and said second member are adapted to be threadedly-engaged and wherein said first member comprises tabs thereon;
   threadably engaging said first member with said second member;
   inserting a fastener radially through said first member, wherein at least a portion of said fastener at least partially extends radially into a depression in a threaded portion of said second member, and wherein rotation of said first member relative to said second member is prevented by said fastener when said fastener at least partially extends radially into said depression;

loosening said fastener until said fastener does not extend radially into said depression; and rotating said first member relative to said second member via imparting an impact to said tabs of said first member, causing said first member to rotate relative to said second member, whereby said clutch brake is expanded.

14. The method of claim 13, further comprising the step of:

installing said clutch brake on an input shaft of a clutch of a vehicle.

15. The method of claim 13 further comprising the step of:

re-securing said first member to said second member via said fastener, wherein rotation of said first member relative to said second member is again prevented by said fastener.

16. The method of claim 13, further comprising the steps of:

installing a first frictional pad on a first surface of said clutch brake; and installing a second frictional pad on a second surface of said clutch brake, wherein said first and second frictional pads are of differing thickness.

17. An adjustable clutch brake comprising:

a first member comprising a first generally disc-shaped body having a central bore disposed therethrough, external threads disposed about at least a portion of said first generally disc-shaped body, at least one detent extending radially inward from said external threads, and at least one first external tab;

a second member comprising a second generally disc-shaped body having a central bore disposed therethrough, internal threads disposed about said central bore, at least one bore extending radially outward through said second generally disc-shaped body from said central bore, and at least one second external tab; and at least one fastener, wherein said internal threads of said second member are threadably engageable with said external threads of said first member, wherein rotation of said second member with respect to said first member adjusts an axial dimension of said clutch brake, and wherein said at least one first external tab is disposed at a first angular displacement from said at least one detent and wherein said at least one second external tab is disposed at a second angular displacement from said at least one radial bore, said first angular displacement being equal to said second angular displacement such that when said at least one first external tab is aligned with said at least one second external tab, said at least one radial bore is aligned with said at least one detent.

18. The adjustable clutch brake of claim 17, wherein at least one of said first member and said second member further comprises a first arcuate section and a second arcuate section removably connected to each other to form said generally disc-shaped body.

19. The adjustable clutch brake of claim 18, wherein said first arcuate section is hingedly connected to said second arcuate section.

20. The adjustable clutch brake of claim 17, wherein said at least one fastener extends radially through at least a portion of said radial bore of said second member and into said at least one detent, bindingly engaging said at least one detent and preventing rotation of said first member relative to said second member.

21. The adjustable clutch brake of claim 17, further comprising at least one internal tang disposed on said first member projecting radially into said central bore of said second member, said at least one internal tang cooperatively engageable with a keyway in an input shaft disposed through said central bore to prevent rotation of said first member with respect to the input shaft.

22. The adjustable clutch brake of claim 17 further comprising at least one generally disc-shaped frictional pad, having a central bore disposed therethrough, disposed on at least one of a first surface of said first member opposite said second member, and a second surface of said second member opposite said first member.

23. The adjustable clutch brake of claim 22, wherein said at least one generally disc-shaped friction pad comprises at least one radial slit therethrough.

24. A method of adjusting a clutch brake comprising the steps of:

obtaining a clutch brake comprising a first member and a second member, wherein said first member and said second member are adapted to be threadedly-engaged;

installing a first frictional pad on a first surface of said clutch brake;

installing a second frictional pad on a second surface of said clutch brake;

threadably engaging said first member with said second member;

inserting a fastener radially through said first member, wherein at least a portion of said fastener at least partially extends radially into a depression in a threaded portion of said second member, wherein rotation of said first member relative to said second member is prevented by said fastener when said fastener at least partially extends radially into said depression, and wherein said first and second frictional pads are of differing thickness.

* * * * *